United States Patent [19]

Vignocchi

[11] Patent Number: 4,655,637
[45] Date of Patent: Apr. 7, 1987

[54] REVETMENT SYSTEM FOR PREVENTING BLUFF EROSION

[76] Inventor: Harry J. Vignocchi, 1375 Woodland La., Riverwoods, Ill. 60015

[21] Appl. No.: 746,999

[22] Filed: Jun. 19, 1985

[51] Int. Cl.[4] ............................................. E02B 3/12
[52] U.S. Cl. .................................. 405/17; 405/15; 405/32; 405/258
[58] Field of Search ..................... 405/15, 16, 17, 18, 405/19, 258, 32, 39, 35, 36, 43, 45

[56] References Cited

U.S. PATENT DOCUMENTS

| | | | |
|---|---|---|---|
| 1,873,496 | 8/1932 | Snyder | 405/16 |
| 3,355,408 | 11/1967 | Mayer | 405/15 |
| 3,383,864 | 5/1968 | Turzillo | 405/18 |
| 3,403,519 | 10/1968 | Balko | 405/45 |
| 3,722,222 | 3/1973 | Rinkel | 405/16 |
| 4,420,275 | 12/1983 | Ruser | 405/15 |
| 4,477,206 | 10/1984 | Papetti et al. | 405/19 |
| 4,521,131 | 6/1985 | Nandlal | 405/15 |
| 4,538,386 | 9/1985 | Di Cello | 405/43 |

FOREIGN PATENT DOCUMENTS

| | | | |
|---|---|---|---|
| 59-230 | 4/1985 | Japan | 405/43 |
| 261246 | 4/1926 | United Kingdom | 405/258 |

*Primary Examiner*—Richard J. Scanlan, Jr.
*Assistant Examiner*—Joseph A. Fischetti
*Attorney, Agent, or Firm*—Trexler, Bushnell, Giangiorgi & Blackstone, Ltd.

[57] ABSTRACT

A method and related revetment system for preventing shoreline slope erosion due to wave and hydrostatic forces. The revetment system includes an elongate, grid-like frame structure of predetermined shape which is set into an excavation in the slope of substantially complementary shape. A filter fabric liner is disposed to overlie the surface of the slope excavation so as to line the excavation beneath the frame structure. The filter fabric liner is sufficiently porous to allow water to pass therethrough while preventing the movement of the soil material of the slope therethrough. The method further includes setting the frame structure into the slope excavation and over the filter fabric liner such that an upper surface portion of the frame structure is substantially continuous with the natural contour of the slope. The volume defined by the frame structure is filled with an aggregate material of a size such that water may move relatively freely therethrough to in effect provide a porous wall structure which can withstand the wave forces. The filter fabric liner and the aggregate material wall structure also serve to substantially prevent the buildup of hydrostatic pressure therebehind by allowing the flow of water therethrough, while preventing the soil material of the slope from washing therethrough.

26 Claims, 4 Drawing Figures

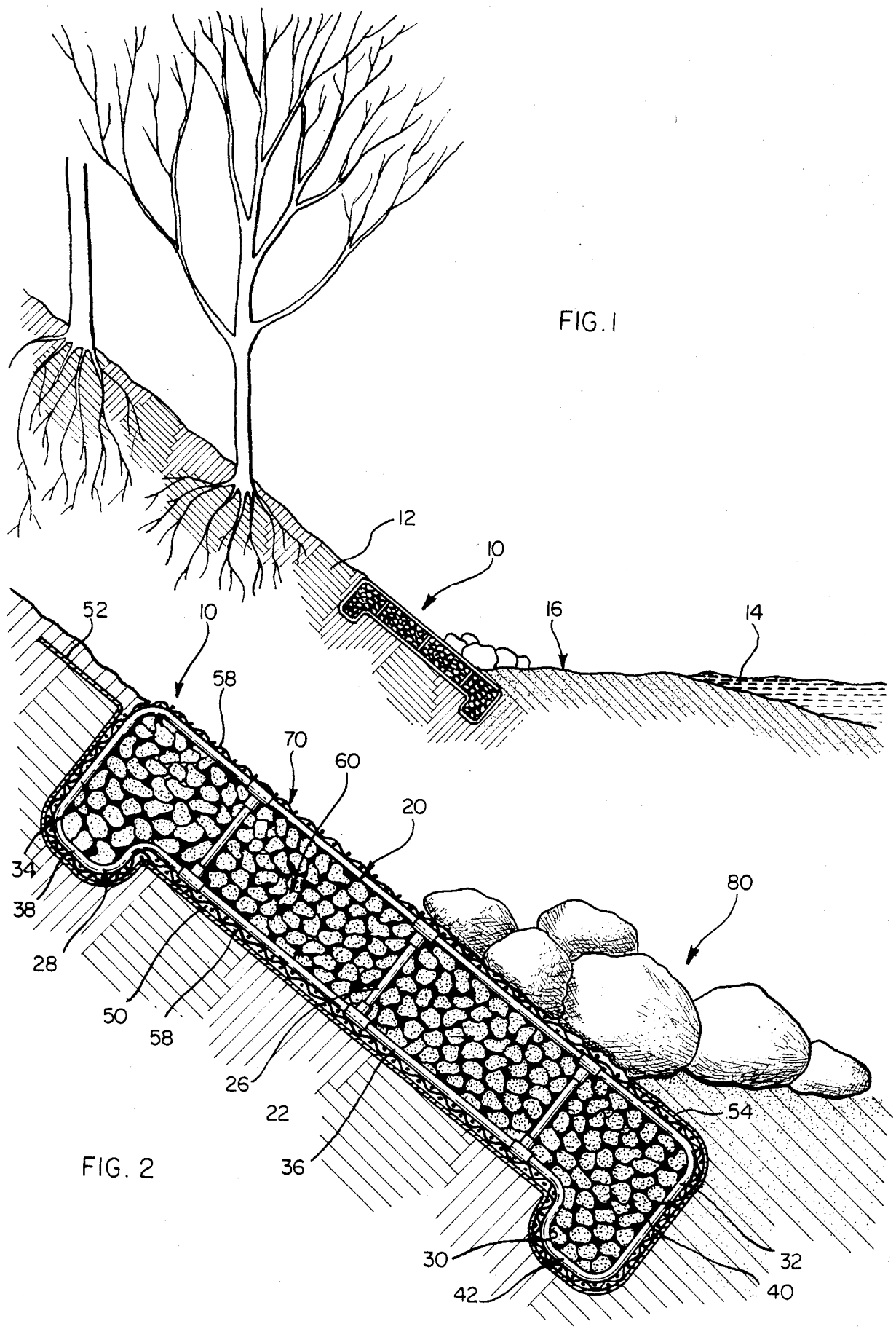

REVETMENT SYSTEM FOR PREVENTING BLUFF EROSION

BACKGROUND OF THE INVENTION

The invention is directed generally to the problem of shoreline erosion, and more particularly to a novel method and system for substantially preventing shoreline bluff or slope erosion due to wave and hydrostatic forces.

The problem of shoreline bluff or slope erosion has long been a matter of concern to littoral landowners who may have erected houses, outbuildings, dock or marina facilities or the like at or adjacent the shoreline. Such erosion can seriously effect such bluffs and slopes, often resulting in the removal of substantial portions of usable land at or adjacent the shoreline to the economic detriment of the landowner.

Especially damaging is the undercutting of such slopes or bluffs due to the wave and hydrostatic forces encountered at or near the shore line. It will be appreciated that substantial undercutting of a bluff or slope can result in the sudden collapse of a considerable amount of the land overlying the undercut slope or bluff portion, resulting in loss and damage to property at or near the crest of the bluff.

The prior art has proposed a number of different methods and/or structures for avoiding such erosion. For example, various systems of jettys and groins may be constructed extending into the water in such a way as to alter the currents and wave patterns so as to avoid or minimize erosion in given areas. However, such alteration of currents invariably results in increased erosion in some adjacent areas of the shoreline and the increased deposition of water borne materials on other adjacent areas of the shoreline. Hence, the use of such groins and jettys is often undesirable when it adversely impacts the littoral rights of adjacent landowners.

Various arrangements of on-shore and off-shore wall structures have also been proposed. Such wall structures may be built partially below the land surface at some point between the high and low tide lines, in an effort to control erosion. In a similar fashion, barriers in the form of containers filled with rock or aggregate material, often referred to as Gabions baskets have been utilized near or in the water in an effort to control the flow and force of water reaching the shore.

Such retaining walls or barriers, Gabions baskets arrangements and the like have generally proven unable to withstand the power of both waves and hydrostatic forces encountered over a period of time. In this regard, both the tide levels as well as wind and wave forces may vary over a period of time. The range of variation in forces encountered makes it difficult to adequately design or place Gabions baskets, retaining walls or other barriers which will be effective under all conditions. Moreover, considerable hydrostatic forces are encountered in the back flow of water from the shore side of these barriers. That is, when waves or tides become of sufficient height to pass over the barriers, considerable pressure is then imposed upon the barriers by the backwash or water attempting to return to the main body of water. Moreover, significant quantities of ground water are often present at or near the shoreline, attempting to enter or reenter the body of water. Hence, such ground water alone, or in combination with the backwash also exerts considerable hydrostatic force upon such barriers or retaining walls or the like.

OBJECTS AND SUMMARY OF THE INVENTION

Accordingly, it is a general object of the invention to provide a novel and improved method and system for preventing shoreline slope erosion due to wave and hydrostatic forces.

A more specific object is to provide a novel and improved revetment system in accordance with the foregoing object.

Briefly, and in accordance with the foregoing objects, a revetment system for preventing shoreline slope erosion in accordance with one aspect of the invention comprises an elongate, three-dimensional, grid-like frame structure comprised of a plurality of interconnected frame elements; a mesh-like material covering over at least preselected portions of the periphery of said frame structure; of said frame structure being set into the slope such that an upper mesh-like material-covered surface thereof is substantially continuous with the natural contour of the slope; a quantity of aggregate material substantially filling the volume defined within said frame structure, said aggregate material being of a size such that water may move relatively freely therethrough; and a filter fabric liner disposed to overlie the surface of the slope beneath said frame structure, said filter fabric liner being sufficiently porous to allow water to pass therethrough while preventing the movement of solid soil material of the slope therethrough, such that said filter fabric liner and said aggregate material filling said frame structure substantially prevent the buildup of hydrostatic pressure behind said revetment system by allowing the flow of water therethrough while preventing the soil material of the slope from washing therethrough. The porous wall portion provided by the aggregate confined by the frame, serves to absorb and dissipate the wave forces, and thereby prevent undercutting of the bluff. Also, due to the porous nature of this structure, backwash and ground water may flow therethrough preventing the buildup of hydrostatic pressure behind the revetment.

In accordance with another aspect of the invention, there is provided a method for preventing shoreline slope erosion due to wave and hydrostatic forces comprising providing an elongate, grid-like frame structure of predetermined shape; excavating said slope to form an excavation of substantially complementary shape for receiving said frame structure; disposing a filter fabric liner to overlie the surface of the slope excavation so as to line said excavation beneath said frame structure, said filter fabric liner being sufficiently porous to allow water to pass therethrough while preventing the movement of the soil material of the slope therethrough; setting said frame structure into said slope excavation and over said filter fabric liner such that an upper surface portion of said frame structure is substantially continuous with the natural contour of the slope; filling the volume defined by said frame structure with an aggregate material of a size such that water may move relatively freely therethrough; such that said filter fabric liner and said aggregate material filling said frame structure substantially prevent the buildup of hydrostatic pressure therebehind by allowing the flow of water therethrough, while preventing the soil material of the slope from washing therethrough; and covering at least said upper surface portion of said frame structure with a mesh-like material.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 1 is an sectional view of a shoreline slope wherein a novel revetment system in accordance with the invention has been installed;

FIG. 2 is an enlarged sectional view of the revetment system of FIG. 1, illustrating further details of the system and a method of the invention;

DETAILED DESCRIPTION OF THE ILLUSTRATED EMBODIMENT

Figure 3:
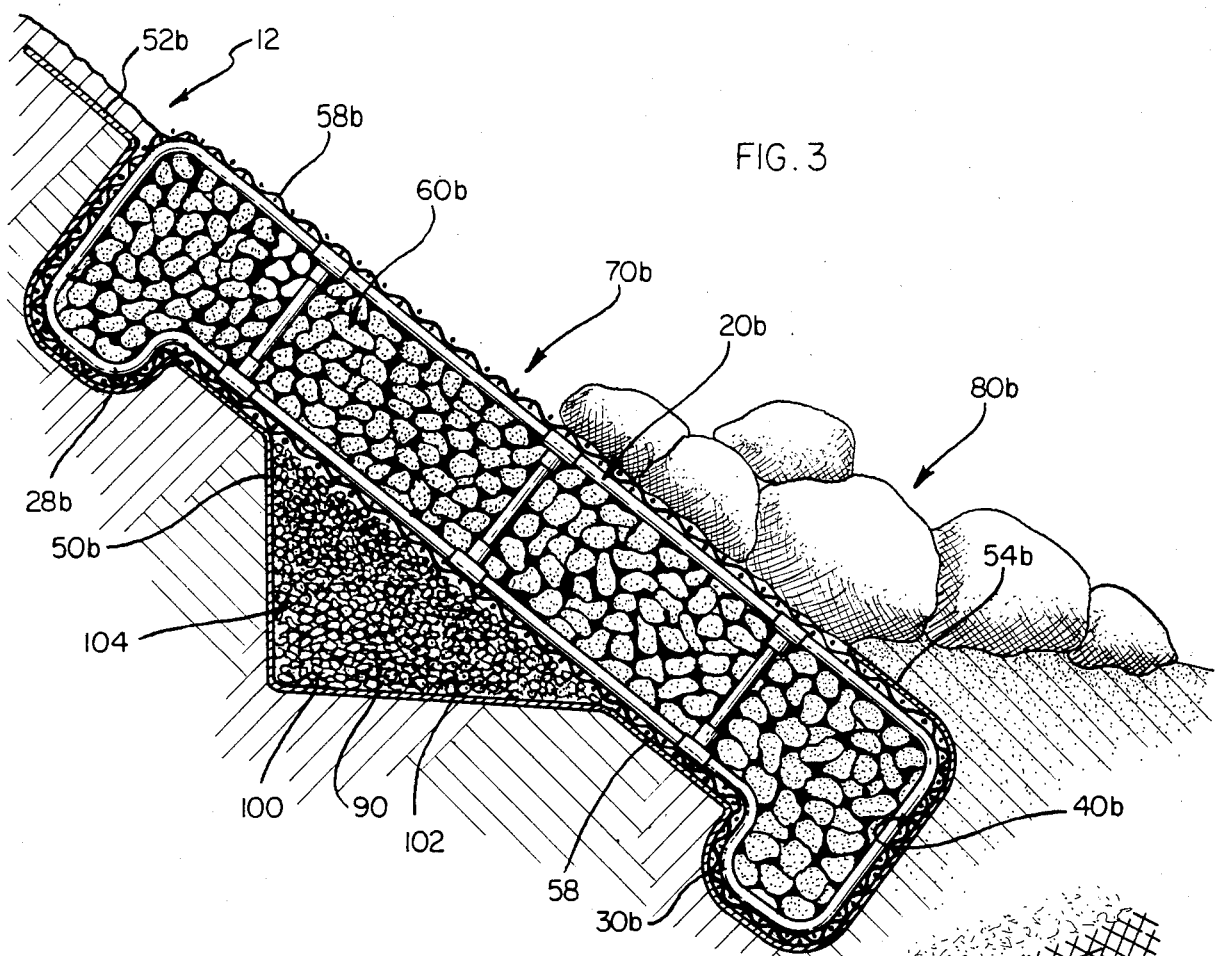
FIG. 3 is a view similar to FIG. 2 illustrating an alternate embodiment of the system and method of the invention.

Referring now to the drawings and intially to FIG. 1, a revetment system in accordance with the invention is designated generally by the reference numeral 10. As illustrated in FIG. 1, the revetment system 10 is shown in a sectional view installed relative to a shoreline slope or bluff area designated generally by reference numeral 12. Advantageously, the revetment system 10 in accordance with the invention substantially prevents erosion of the shoreline bluff or slope 12 due to both wave forces and hydrostatic forces. Such wave forces are encountered, for example, due to the waves produced by wind, tides and current on a body of water 14 in the area about the shoreline 16 which can undercut the bluff. Such erosion may further be caused by hydrostatic forces acting upon the bluff or slope 12 due to backwash, or other water returning to or entering the body of water 14 from the land behind the surface of the slope 12, as well as by ground water resulting from water previously deposited upon the slope, run-off from rains, or general drainage.

Figure 4:
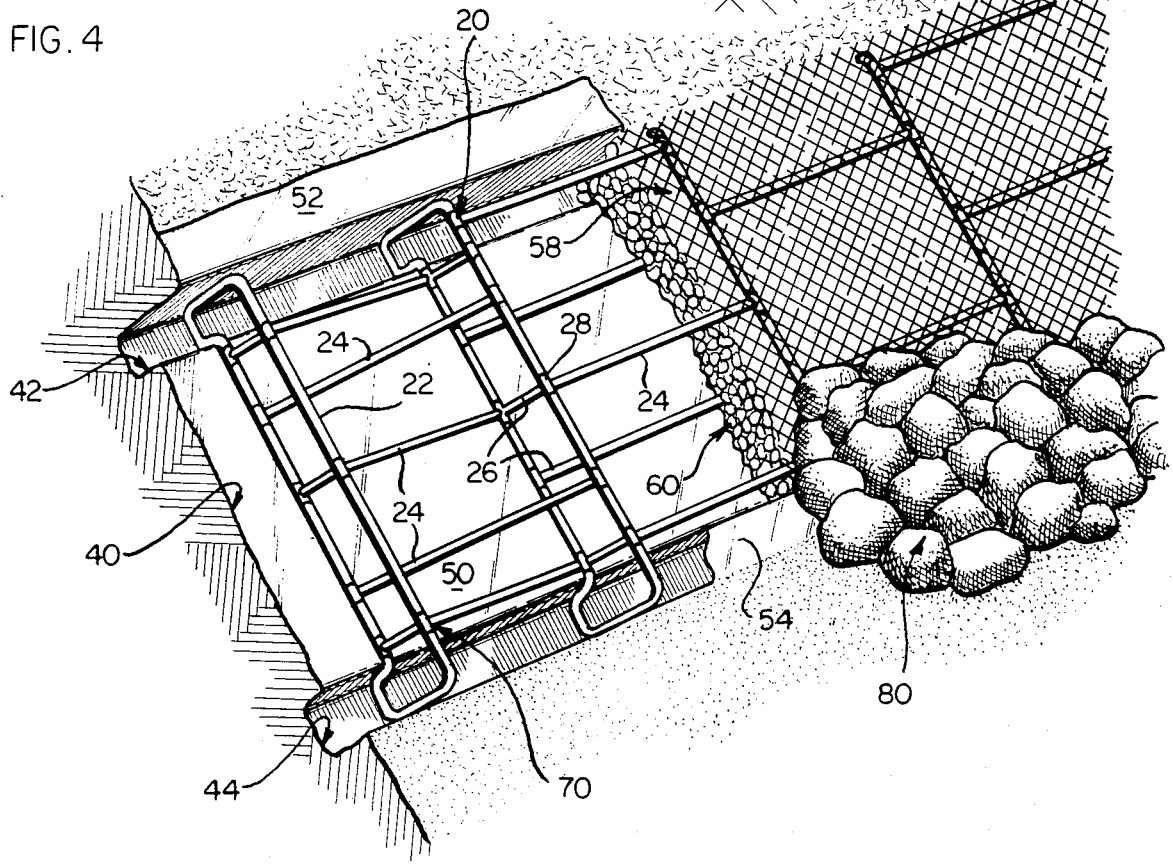
FIG. 4 is a perspective view illustrating various stages in the construction of a revetment system of the invention in accordance with the method of the invention.

Referring now also to FIG. 2, the revetment system, in accordance with the invention is shown in a view similar to FIG. 1, but greatly enlarged. With reference also to FIG. 4, which illustrates various stages in the method of constructing the revetment system of the invention, it will be seen that this revetment system 10 comprises an elongate, three-dimensional, grid-like frame structure 20. This frame structure 20 will be seen to extend longitudinally along the shoreline, that is, along the length of the portion of shoreline slope 12 which is to be protected thereby. Moreover, the frame structure 20 is of sufficient width so as to span substantially the range of elevations of the slope 12 which is intended to be protected thereby. In this regard, the elevations to be spanned by the frame 20, and hence by the revetment system 10, may be selected to run generally from some level somewhat below the nominal grade level at the shoreline 16 to some elevation of the slope 12 a sufficient distance thereabove to assure that most waves from body of water 14 will fall upon the portion of the slope 12 protected by the revetment system 10.

The frame structure 20 will be seen to be comprised of a plurality of elongate, interconnected frame elements or members 22, 24 and 26. Preferably, all of these frame elements are formed from tubular steel pipe, on the order of one-inch in diameter.

The frame elements or members 22 preferably comprise generally rectilinear frame portions which may be produced by bending or otherwise forming the tubular pipe material and welding or otherwise joining together free ends thereof. In the illustrated embodiment, it will be noted that each of these frame members 22 further is shaped to define a pair of outwardly extending footing portions 28, 30. These footing portions 28 and 30 are generally located at either end of the frame elements 22 so as to define a generally broad, shallow U-shaped appearance thereof in cross-section, for example as viewed in FIG. 2. As will be discussed in greater detail hereinafter, the footing portions 28 and 30 will serve to better anchor the overall revetment structure 10.

The second frame elements 24 comprise elongate tubular members which interconnect the first, generally rectangular frame elements 20. These elongate tubular members 24 may be joined with the frame elements 22 by suitable means such as fittings 28. These joining members 24 preferably run longitudinally intermediate the respective frame elements 22, so as to hold these frame elements together in a generally upright position and in generally parallel and spaced apart condition to define the elongate, three-dimensional grid-like frame structure 20. As illustrated in FIG. 4, these joining elements 24 may run intermediate both upper "rail" and lower "rail" portions of the respective frame elements 22. Alternatively, and as also illustrated in FIG. 4, at the end most frame element 22, the joining members or bracing members 24 may run diagonally. That is to say, these latter joining members 24 may run intermediate a top rail portion of one of the frame members 22 to be joined thereby and a bottom rail portion of the next adjacent frame member and vice-versa.

Finally, additional frame elements 26 comprising bracing elements, run transversely across the generally rectangular frame elements or members 22 and are joined thereto by ones of fittings 28 or by further, similar fittings 28.

Further in accordance with the overall revetment system 10 and the method of the invention, the slope 12 is excavated so as to form an excavation 40 of generally complementary shape for receiving the frame structure 20 therein, so that an upper surface of the frame structure 70 is substantially continuous with the natural contour of the slope 12, as best viewed for example in FIGS. 1 and 2. Hence, this excavation 40, like the the frame structure 20, defines in cross-section a generally broad, shallow U-shaped configuration. The more deeply excavated uppermost and lowermost portions of the excavation 40 as generally indicated at 42 and 44, thereby accommodate the downwardly extending footing portions 28 and 30 of the frame structure 20, which will be understood to form footings for further securing the revetment system relative to the slope 12.

In accordance with a further feature of the invention, a filter fabric liner 50 is next disposed so as to overlie substantially the entire surface of the excavation, so as to effectively line the excavation beneath the frame structure 20. This filter fabric liner is of sufficiently porous construction to allow ground water or backwash water to pass therethrough while preventing the erosion or movement of solid soil material of the slope therethrough. One suitable such material is sold under the name SUPAC 5NP. In the embodiment illustrated, the filter fabric liner is also extended or carried out somewhat above the excavation 40, as indicated generally at reference numeral 52. Moreover, at a lower elevation of excavation 40, the filter cloth liner material, in the embodiment illustrated, is also extended or carried back around the frame structure somewhat to overlie a portion of the top thereof as indicated at 54. This area below extension 54 of the filter fabric liner is that portion of the revetment structure which is generally carried below the grade level of the shoreline 16. This will be seen to prevent material of the shoreline 16 or slope 12 from entering into the frame structure and remainder of the revetment structure below the filter fabric liner extension 54, while still permitting the bidirectional flow of water relatively freely therethrough.

Before the frame structure 20 is set into the ground, the lower and side portions are covered with a durable, strong mesh-like material, which in the illustrated embodiment and is in the form of chain-link-type fencing material and is designated 58. A sufficient quantity of the mesh material 58 is provided to cover the upper surface 70 of the revetment structure, however, the upper portion thereof is initially left open for reception of the aggregate material 60 as will be described. It should be noted, however, that while the preferred, illustrated form of the inventor includes the mesh 58 about the entire periphery thereof, it is necessary that the mesh 58 cover only the upper surface 70 of the revetment system 10.

Next, the frame structure 20 is set into the excavation 40 overlying the filter fabric liner 50, and preferably with fabric liner portion 54 partially wrapped over a lower portion thereof as just described. As mentioned previously, the frame structure is set into the excavation 40 such that an upper surface 70 thereof is substantially continuous with the natural contour of the slope 12. Also this upper surface is also open for acceptance of the aggregate 60.

Thereupon, a quantity of aggregate or stone material 60 is introduced to sustantially fill the volume defined within the frame structure 20. This aggregate material 60 is preferably of a size such that water may move relatively freely therethrough, yet it can withstand the force of the waves to which it will be subjected. Accordingly, the filter fabric liner 50 and the aggregate material 60 filling the frame structure 20 together substantially prevent the buildup of hydrostatic pressure behind the revetment system by allowing the flow of water therethrough while preventing the soil material of the slope from washing therethrough. Also the aggregate 60 which fills the frame 20 provides a porous wall or surface which can withstand the wave forces, and in effect serves to dissipate and absorb the wave forces, while preventing undercutting or a washing away of the lower bluff area. The porous nature of the wall provided by the aggregate 60 also serves to permit the backwash and ground water to flow freely outwardly of the bluff into the lob 14, thereby preventing the buildup of hydrostatic pressure behind the revetment.

Following the filling of the frame structure with the aggregate material 60, the mesh-like covering material 58 is secured to the upper portion of the frame structure 20 so as to substantially cover the entire upper surface 70 thereof. As mentioned above, this mesh material may comprise chain-link-type fencing material, for example, six gauge aluminized chain-link material may be utilized. This chain-link material may be affixed by the use of wires or other suitable means to the members of the frame structure 20. In the illustrated embodiment, such chain-link material 58 is utilized around the entire periphery of the frame structure 20. Accordingly, the mesh or chain-link material is affixed to those portions of the frame which will extend below grade level prior to the setting of the frame structure into the excavation 40. The remaining portion of the upper mesh or chain-link covering is then affixed to the frame structure following the introduction of the stone or aggregate 60.

In the illustrated embodiment, a quantity of additional fill material is also disposed over at least a lower elevation portion of the frame structure 20 and over the mesh covering 58. Preferably, this additional fill material comprises relatively large stone, boulders or other similar material. That is, this additional fill material 80 is preferably of considerably larger size than the aggregate 60 filling the frame structure 20, and serves to further anchor the revetment system 10 in place.

Referring now also to FIG. 3, an alternate embodiment of the revetment system of the invention is illustrated. In most respects, the embodiment of FIG. 3 is substantially similar to that illustrated and described hereinabove with refernce to FIGS. 2 and 4. Accordingly, like reference numerals together with the suffix b are utilized in FIG. 3 to designate like elements and components.

In this regard, the embodiment of FIG. 3 utilizes a similarly constructed frame structure 20b, comprising elements 22b, 24b and 26b set into an excavation 40b of complementary shape. Footing portions 28b and 30b extend somewhat more deeply into corresponding portions of the excavation 40b. A similar filter fabric liner material 50b and aggregate 60b and mesh covering 58b are also utilized. Preferably additional fill material 80b is also superimposed over a lower portion of the aggregate-filled and mesh-covered revetment structure.

Departing from the embodiment of FIGS. 2 and 4, the embodiment of FIG. 3 further includes an additional quantity of gravel or aggregate fill material 90 intermediate at least a portion of the slope 12 and a medial elevational portion of the frame 20b. Preferably, this additional gravel fill material 90 is of a size so as not to readily pass through the aggregate material 60b in the frame structure. Moreover, the filter fabric liner is preferably disposed beneath this additional quantity of gravel fill 90. More particularly, this gravel fill 90 is disposed in depressions in the slope, which may occur either naturally, or due to removal of sand or like relatively fine soil materials from portions of the slope in preparing the excavation 40b. Hence, the gravel fill 90 is disposed in such depressions in the slope to define a substantially flat, continuous contour of the surfaces of the slope beneath the frame structure 20b.

Alternatively, and as particularly illustrated in FIG. 3, the depression 100 filled by the gravel fill material 90 comprises an elongate depression which is substantially logitudinally coextensive with the frame structure 20b along the slope 12 to be protected. The depression is preferably formed by removing the material of the slope during formation of the excavation 40b to define coverging, generally vertical and horizontal surfaces 102 and 104. Hence, the depression thus defined is generally L-shaped in cross-section as viewed in FIG. 3. Moreover, this depression 100 preferably extends between elevations of the slope which are respectively spaced apart from and intermediate the footing portions 28b and 30b. That is, the respective horizontal and vertical surfaces or boundaries of this depression 100 join the excavation 40b at points or locations which are preferably substantially equally spaced apart from and intermediate the portions thereof which accommodate the respective footings 28b and 30b.

In order to more fully describe a particular embodiment, some dimensions of a preferred frame portion 20, as well as the size of a preferred aggregate or stone material 60 are given hereinafter. However, it will be understood that these dimensions are by way of example only and in no way limit the invention.

In this regard, in the illustrated embodiment the respective footing portions 28 and 30 define respective opposite side surfaces 32, 34 of the frame structure 20 which are substantially three feet in length. The length of the frame member 22 intermediate the respective footing portions 28 and 30, as indicated by reference numeral 36, is preferably on the order of ten feet. Similary, the respective widths of the two footing portions 28 and 30 as indicated at respective reference numerals 38 and 42 is substantially one and one-half feet. Accordingly, the overall width spanned by the frame member 22 is on the order of thirteen feet. Preferably, the linking or joining members 24 are substantially on the order of six feet in length, whereby respective frame elements or members 22 are spaced apart in substantially parallel orientation at approximately six foot intervals along the length of the slope to be protected.

In this regard, it will be appreciated that the diagonally running joining members 24 running between the end most frame member or element 22 and the next adjacent frame member or element 22 are somewhat longer, preferably on the order of six feet three inches, to substantially maintain the six foot spacing between frame elements or members 22. Preferably, the stone or aggregate material 60 filling the volume defined by the frame structure 20 consists of stone material averaging from on the order of six inches to on the order of ten inches in transverse dimension.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined in the appended claims and equivalents thereof. Accordingly, the aim in the appended claims is to cover all such changes and modifications as fall within the true spirit and scope of the invention.

The invention is claimed as follows:

1. A revetment system for preventing shoreline slope erosion due to wave or hydrostatic forces, said system comprising: an elongate, three-dimensional, grid-like frame structure comprised of a plurality of interconnected frame elements; a mesh-like material covering over at least preselected portions of the periphery of said frame structure; said frame structure adapted to be set into the slope such that an upper mesh-like material-covered surface thereof is substantially continuous with the natural contour of the slope; a quantity of aggregate material substantially filling the volume defined within said frame structure, said aggregate material being of a size such that water may move relatively freely therethrough; and a filter fabric liner disposed to overlie the surface of the slope beneath said frame structure, said filter fabric liner being sufficiently porous to allow water to pass therethrough while preventing the movement of solid soil material of the slope therethrough, such that said filter fabric liner and said aggregate material filling said frame structure substantially prevent the buildup of hydrostatic pressure behind said revetment system by allowing the flow of water therethrough while preventing the soil material of the slope from washing therethrough.

2. A revetment system according to claim 1 wherein said frame structure extends longitudinally along said shoreline along a slope to be protected thereby, and wherein said frame structure spans substantially the range of elevations of slope to be protected thereby and defines a generally rectangular cross-sectional peripheral configuration.

3. A revetment system according to claim 2 wherein said frame structure further defines at least one footing portion which extends outwardly from said generally rectangular cross-sectional configuration so as to extend more deeply into said slope than the remainder of the frame, said footing portion being substantially co-extensive longitudinally with said frame structure for further anchoring said revetment system relative to said slope.

4. A revetment system according to claim 3 wherein a pair of said footing portions are provided, one adjacent each of an uppermost and lowermost portion of the elevations of said slopes spanned by said frame structure, such that said frame structure has the appearance generally of a relatively broad, shallow U-shape in cross-section.

5. A revetment system according to claim 1 and further including a quantity of additional fill material disposed on top of at least of a lower elevation portion of said frame structure and over said mesh-like material.

6. A revetment system according to claim 1 wherein said mesh-like material comprises chain-link type fencing material.

7. A revetment system according to claim 1 wherein said mesh-like material extends about substantially all of the periphery of said frame structure.

8. A revetment system according to claim 1 and further including a quantity of gravel fill intermediate at least a portion of said slope and a medial elevational portion of said frame, said gravel fill being of a size so as not to readily pass through said aggregate material in said frame structure.

9. A revetment system according to claim 8 wherein said filter fabric liner is disposed beneath said quantity of gravel fill.

10. A revetment system according to claim 8 wherein said gravel fill is disposed in depressions in said slope to thereby define a substantially flat, continuous contour of the surfaces beneath said frame.

11. A revetment system according to claim 10 wherein said depressions filled with gravel include depressions created by the removal of sand or like relatively fine soil materials from portions of said slope.

12. A revetment system according to claim 8 and further including an elongate depression formed in said slope substantially longitudinally coextensive with said frame structure and spanning medial elevations relative to said frame structure, said gravel fill material being disposed in said depression so as to define a substantially flat, continuous surface beneath at least a medial portion of said frame.

13. A revetment system according to claim 12 wherein said frame structure further defines a pair of footing portions adjacent each of an uppermost and topmost portion of the elevations of said slope spanned by said frame structure, said footing portions defining therebetween said medial portion and extending more deeply into said slope than the remainder of said frame for further anchoring said revetment system relative to said slope, such that said frame has the appearance generally of a broad, shallow U-shape in cross-section.

14. A revetment system according to claim 13 wherein said depression to be filled with said gravel fill material is defined by converging, generally vertical and horizontal surfaces so as to be generally L-shaped in cross-section and wherein said depression extends between elevations respectively spaced from and intermediate of said footings.

15. A revetment system according to claim 1 wherein said frame elements comprise a first frame element comprised of tubular members formed into a generally rectangular configuration, said first frame members being spaced apart along the longitudinal extent of said slope, and second elongate, tubular frame members respectively joining the spaced apart first frame members at least at upper and lower surfaces thereof relative to the surface of said slope.

16. A revetment system according to claim 15 wherein said frame elements further include bracing elements coupled with at least selected ones of said generally rectangular first frame members and extending transversely thereacross.

17. A method for preventing shoreline slope erosion due to wave and hydrostatic forces comprising: providing an elongate, grid-like frame structure of predetermined shape; excavating said slope to form an excavation of substantially complementary shape for receiving said frame structure; disposing a filter fabric liner to overlie the surface of the slope excavation so as to line said excavation beneath said frame structure, said filter fabric liner being sufficiently porous to allow water to pass therethrough while preventing the movement of the soil material of the slope therethrough; setting said frame structure into said slope excavation and over said filter fabric liner such that an upper surface portion of said frame structure is substantially continuous with the natural contour of the slope; filling the volume defined by said frame structure with an aggregate material of a size such that water may move relatively freely therethrough; such that said filter fabric liner and said aggregate material filling said frame structure substantially prevent the buildup of hydrostatic pressure therebehind by allowing the flow of water therethrough, while preventing the soil material of the slope from washing therethrough: and covering at least said upper surface portion of said frame structure with a mesh-like material.

18. A method according to claim 17 wherein the step of providing said frame structure further comprises providing said frame structure having a generally rectangular cross-sectional configuration and at least one footing portion extending from said rectangular cross-sectional configuration, and wherein the steps of excavating said slope and of setting said frame structure into the slope includes excavating portions of said slope more deeply to accommodate said footing portion and setting said footing portion correspondingly more deeply into said slope than the remainder of said frame structure.

19. A method according to claim 18 wherein said providing of said footing portion includes providing a pair of similar footing portions adjacent each of a topmost and bottommost portion of the elevations of said slope spanned by said frame structure, and wherein said excavating and said setting said frame structure into said slope are such both that said frame structure and the excavation of said slope for accommodating said frame structure have an appearance generally of a broad, shallow U-shape in cross-section.

20. A method according to claim 17 and further including the step of disposing a quantity of fill material on top of the mesh covering at least a lower elevation portion of said frame structure relative to said slope.

21. A method according to claim 17 and further including the step of disposing a gravel fill material in any depressions in said slope beneath said frame structure to thereby define a substantially flat, continuous surface beneath said frame structure.

22. A method according to claim 20 and further including forming ones of said depressions to be filled with said gravel by removal of sand or other relatively fine soil materials from portions of said slope.

23. A method according to claim 17 wherein said excavating further includes forming an additional depression to extend beneath a medial portion of said frame when set into said slope, said additional depression being defined by converging generally vertical and horizontal surfaces so as to be generally L-shaped in cross-section, and further including the step of filling said additional depression with a gravel fill material.

24. A method according to claim 23 wherein the step of disposing said filter fabric liner includes disposing said filter fabric liner against the surfaces of said additional depression prior to the filling thereof with said gravel fill material.

25. A revetment system for preventing shoreline slope erosion due to wave or hydrostatic forces, said system comprising: an elongate three-dimensional frame structure; a mesh-like material covering over at least the upper surface portion of the periphery of said frame structure; said frame structure adapted to be set into the shoreline slope such that the upper mesh-like material-covered surface portion thereof is substantially continuous with the natural contour of the slope; a quantity of aggregate material substantially filling the volume defined within said frame structure, said aggregate material being of a size such that water may move relatively freely therethrough; and a filter fabric liner disposed beneath said frame structure, said filter fabric liner being sufficiently porous to allow water to pass therethrough while preventing the movement of solid soil material of the slope therethrough, such that said aggregate material confined by said frame and mesh material providing a porous wall structure which can withstand and dissipate the wave forces by permitting water to flow therethrough, and the filter fabric liner in conjunction with said aggregate material filling said frame structure substantially prevent the buildup of hydrostatic pressure behind said revetment system wall structure by allowing the flow of water therethrough while preventing the soil material of the slope from washing therethrough.

26. A revetment system according to claim 25 wherein said mesh-like material extends about the periphery of said frame structure, and said frame structure includes at least one footing portion to anchor said frame into the slope.

* * * * *